United States Patent [19]

Bernhardt

[11] Patent Number: 4,551,684
[45] Date of Patent: Nov. 5, 1985

[54] NOISE REDUCTION IN LASER AMPLIFIERS

[75] Inventor: Anthony F. Bernhardt, Berkeley, Calif.

[73] Assignee: Spectra-Physics, Inc., San Jose, Calif.

[21] Appl. No.: 463,713

[22] Filed: Feb. 4, 1983

[51] Int. Cl.[4] ............................................. H01S 3/00
[52] U.S. Cl. ....................................... 330/4.3; 372/93
[58] Field of Search ..................... 330/4.3; 372/19, 20, 372/96, 98, 99, 101, 103, 107, 108, 93, 94; 350/319, 574

[56] References Cited

U.S. PATENT DOCUMENTS

| 3,235,813 | 2/1966 | Kogelnik et al. | 330/4.3 |
| 4,158,176 | 1/1979 | Hunt et al. | 330/4.3 |
| 4,191,928 | 3/1980 | Emmett | 330/4.3 |
| 4,257,071 | 3/1981 | Bradley et al. | 332/7.51 |

OTHER PUBLICATIONS

Bichsel, et al., "Photolytically Pumped XeF (C-A) Laser Studies", J. Appl. Phys., vol. 52, pp. 4429-4434, (1981).

Migus, et al., "Amplification of Subpicosecond Optical Pulses: Theory and Experiment", IEEE Journal of Quantum Electronics, vol. 18, p. 101.

Primary Examiner—S. C. Buczinski
Assistant Examiner—Linda J. Wallace

[57] ABSTRACT

Amplified spontaneous emission is substantially reduced in a novel optical amplifier wherein the gain medium is disposed within a converging region of the coherent signal, which converging region terminates in a waist at or near a limiting stop or saturable absorber. In contrast to the converging coherent signal flux, the amplified spontaneous emission flux is nonconverging and therefore most of the latter is removed by a spatial filter or saturable absorber.

4 Claims, 5 Drawing Figures

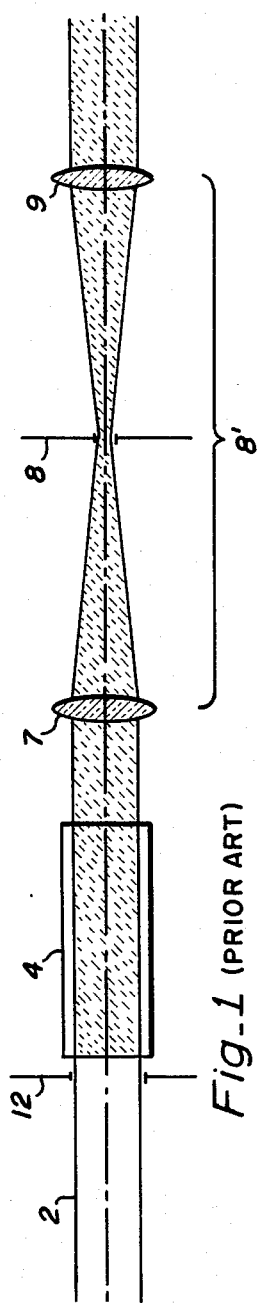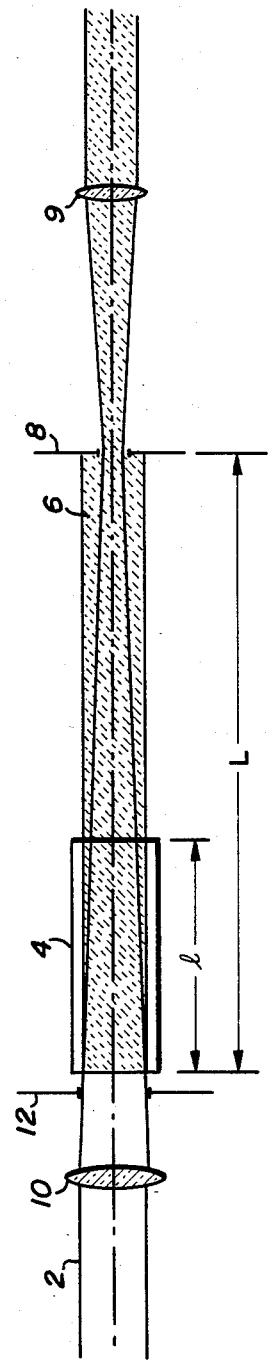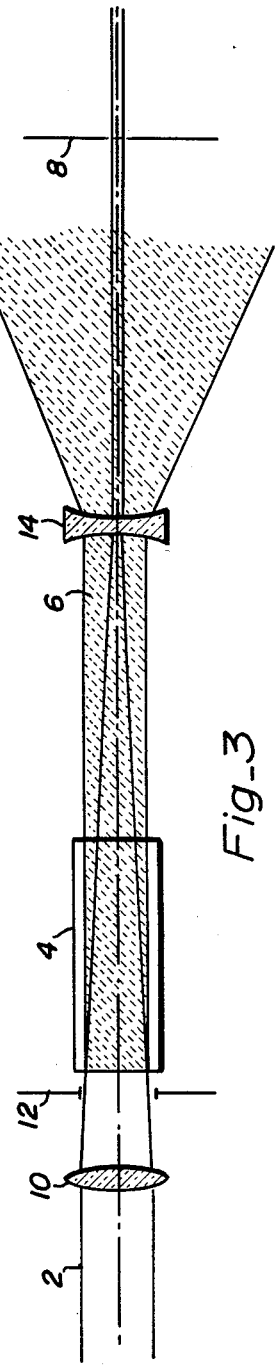

NOISE REDUCTION IN LASER AMPLIFIERS

FIELD OF THE INVENTION

The present invention is in the field of active optical circuit elements and particularly relates to the reduction of the amplified spontaneous emission noise component in the output of component gain stages of multiple stage optical amplifiers and in regenerative laser amplifiers and oscillators.

BACKGROUND OF THE INVENTION

It is well known in the art that the noise component in multi-stage optical amplifier output can be reduced by providing optical isolation between gain stages. Such isolation is ordinarily achieved with a spatial filter or alternatively, a saturable absorber. Undesired feedback and (higher) modal impurities are thereby reduced.

The contribution to the noise power which arises from spontaneous emission is ordinarily regarded as an ultimate limit of quantum mechanical origin. Although this is certainly the case, there are aspects to the effects of this noise component which are susceptible of control. The present invention recognizes that the spontaneous emission component present at the output of a gain element has been amplified and that discrimination against the further amplification of an intrinsic spontaneous emission component in each, or following gain stages, reduces the absolute noise at the output.

In the conventional amplifier the optical flux propagates through the gain medium following which a converging lens is used to focus the amplified signal through a selective limiting device such as a spatial filter or saturable absorber. The amplified flux includes a component arising from spontaneous emission in the gain medium, which component is also amplified by the gain medium. The amplified spontaneous emission (hereafter, "a.s.e.") flux is so distributed that a transverse section through the gain medium includes a central region dense in coherent amplified signal (the converging component) in combination with an a.s.e. background and a surrounding "penumbral" region containing only the widely distributed a.s.e. component. In the prior art, a significant portion of the amplified spontaneous emission flux is transmitted through the spatial filter or saturable absorber because both coherent signal and the a.s.e. portion are focused by a lens component provided to assure maximal transmission through the saturable absorber or spatial filter. Consequently the a.s.e. portion is presented to the succeeding gain stage(s) where it is subject to further amplification.

An example of the prior art directed to the study and reduction of a.s.e. in multistage optical amplifiers is the recent work of Migus, et al, "Amplification of Subpicosecond Optical Pulses: Theory and Experiment", IEEE J. Quant. Elect., QE-18, pp. 101-109 (1982).

SUMMARY OF THE INVENTION

It is an object of the present invention to selectively remove from the amplified optical flux a substantial portion of the a.s.e. component accompanying the propagation of the coherent signal through the gain medium.

In one feature of the invention the coherent amplified portion of the signal is caused to converge during propagation through the gain medium to form a waist in the neighborhood of an optical isolator component while the propogation vectors of the accompanying a.s.e. component generated within the gain medium are more widely distributed in direction.

In another feature of the invention, the converging coherent portion of the optical flux is transmitted through the isolator component while only that small portion of the a.s.e. component of the optical flux is transmitted for which the a.s.e. propogation vectors lay within the limits defined by the envelope of the coherent signal.

In still another feature of the invention a diverging lens is disposed between the gain medium and the isolator component whereby the penumbral region of a.s.e. flux surrounding said converging coherent portion is greatly diverged while the central, heretofore converging coherent flux only converges less rapidly, becomes collimated or diverges much less than the a.s.e. component.

The above and other attributes are achieved by imposing convergence upon the input signal as it propogates through the gain medium. The waist in the converging amplified flux occurs at, or in the neighborhood of an optical isolator which can be an aperture or saturable absorber. Spontaneous emission occurs in the gain medium yielding photons exhibiting propogation vectors widely distributed in direction. Only that portion of the spontaneous emission flux will be transmitted by the aperture or absorber which portion is within the directional constraint defined by the envelope of the converging amplified flux. Insofar as the a.s.e. distribution is relatively less constrained compared to the highly constrained coherent signal, the invention discriminates between (most of the) a.s.e. and the coherent signal fluxes by exploiting the gross differences in the directional distribution of propogation vectors for the respective flux components.

BRIEF DESCRIPTION OF THE DRAWINGS

FIG. 1 is a schematic illustration of prior art apparatus.

FIG. 2 illustrates an embodiment of the present invention.

FIG. 3 illustrates an alternate embodiment of the present invention.

DESCRIPTION OF THE INVENTION

Figure 4:
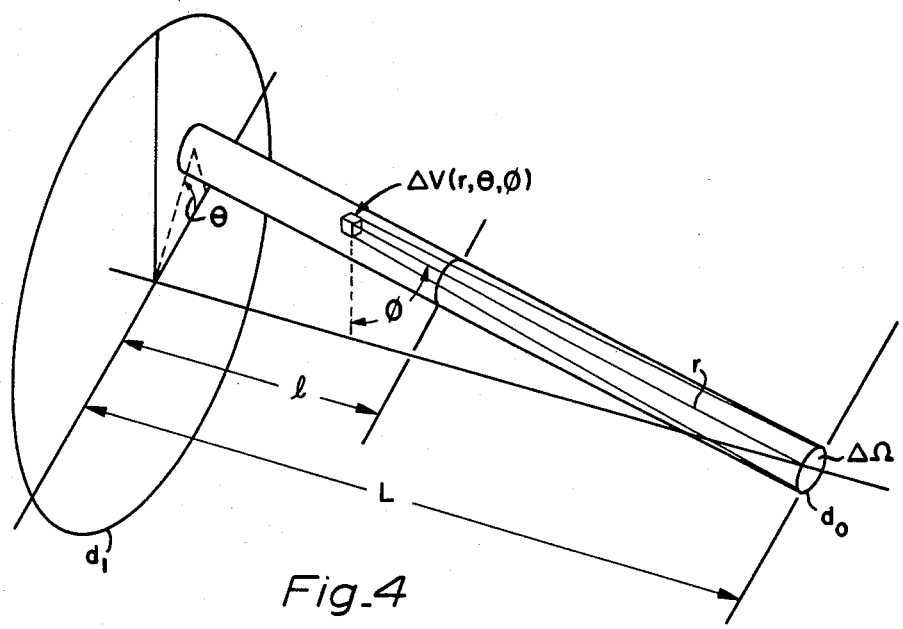
FIG. 4 shows the relationship of the spatial variables of interest.

Turning now to FIG. 1, there is shown a typical prior art gain stage wherein a spatial filter is employed to secure isolation for the output of an active optical gain stage. In the arrangement shown, optical signal flux 2 propogates through a gain medium 4 (which may be an optically pumped dye laser for example). For the example shown as with the invention to be described, the gain medium geometry is chosen to exhibit an axial length which is sufficiently long to realize the desired gain and for which the transverse dimension is small enough to assure uniform (transverse) pumping. Thus the gain medium is usually long compared to the transverse dimension for the above and other reasons well known in the art.

The coherent amplified optical signal includes a noise component 6 which arises from spontaneous emission within the gain medium and which is subject to amplification (a.s.e.). Spontaneous emission photons are emitted in diverse directions with a directional distribution which depends upon the pump radiation and any polarizing influences (which are usually absent). Amplification in the gain medium then follows. A converging lens 7 focusses the entire optical flux, including the a.s.e. component, through a pinhole aperture 8 of spatial filter 8'. The now diverging flux is then collimated by lens 9 and the resulting parallel flux is subject to a further gain stage or other application. While the gain of the optical signal may be boosted further by chaining a number of such elemental amplifier stages the concomitant processing and increase of the a.s.e. intensity in such multiple stages leads to an excessive noise component in the output signal.

Turning now to FIG. 2, an embodiment of the present invention employs a lens 10 to converge the optical flux propagating through the gain medium 4 to form a waist at or near the plane of the pinhole aperture 8. After transmittance by the aperture 8 the optical flux is collimated or refocused through a subsequent gain stage by lens 9. The use of a saturable absorber instead of a spatial filter is deemed to be a matter of choice for the optical designer.

A central observation of the present invention is that while the coherent flux propagates with a converging aspect through gain medium 4, the accompanying a.s.e. component 6 is not converging. Thus, in the absence of optical manipulation to focus this penumbral component through the aperture 8, most of this component will be absent from the output beam 11.

The intensity of the a.s.e. component which is transmitted through the aperture 8 may be compared with that portion (which has been characterized as "penumbral") removed from the signal by simple geometrical calculation. It is assumed that the spontaneous emission flux is distributed spatially over the transverse radial coordinate as determined by the geometry of the gain medium and the spatial dependence of the gain. Accordingly, only a small portion of the resulting a.s.e. flux will fall within the constraints defined by the convergent flux. This small portion of the a.s.e. will be present in the optical flux transmitted through the isolator (aperture 8 or an equivalent saturable absorber), but this small portion of the a.s.e. can be reduced to an arbitrarily small fraction of the coherent flux according to the present invention, while the major portion of the a.s.e. flux distributed over the penumbral region will be removed from further processing.

In order to estimate the improvement in signal-to-noise ratio between the invention and the prior art, assume that the input signal is limited by an aperture 12 of diameter $d_l$. In the prior art, the a.s.e. flux propogates in a cylinder of diameter $d_l$ and a large fraction of the flux is converged through a spatial filter to the next stage or output. In the present invention, only that a.s.e. component is transmitted (through an aperture of diameter $d_o << d_l$) for which the propogation vectors are constrained by the limits of the converging envelope of the coherent signal.

FIG. 4 suggests a framework for calculating the a.s.e. flux remaining within the constraints of the converging coherent signal of the present invention. From an emission site at $(r, \theta, \phi)$ spontaneous emission yields photons including that fraction emitted into the solid angle $\Delta\Omega$ subtended by aperture $d_o$. These will be present in the output signal and will have been amplified in traversing the gain medium. The estimation of a.s.e. intensity at the aperture $d_o$ is expressed as a product of the probability (per unit volume) of spontaneous emission, the fraction of spontaneous emission emitted therefrom which intercept the aperture $d_o$, the gain experienced by this fraction in traversing that portion of the gain medium between the emission site and the aperture $d_o$. This is expressed as $$\Delta I_{a.s.e.} = (N_s/\tau_s)\Delta V e^{g(r)}\Delta\Omega(r,\theta,\phi)$$

where $N_s$ is the number density of excited states which undergo spontaneous emission with a probability $1/\tau_s$, $\Delta V$ is the volume element from which emission occurs, $\Delta\Omega$ is the solid angle into which emission occurs and the exponential expresses the gain experienced by this spontaneous emission event.

In order to obtain an order-of-magnitude estimate of the comparative a.s.e. intensities respectively for the invention and the prior art, consider the aforesaid converging volume to be the approximate sum of a number K of elemental cylinders, each of diameter $d_o$, originating in the entrance plane aperture $d_l$ and terminating at the aperture $d_o$. A fraction of the spontaneous emission originating within such a cylinder contributes a portion which will be transmitted through the aperture $d_o$. This may be estimated as $$\Delta I_{cylinder} = \frac{N_s}{\tau_s} \frac{\pi\left(\frac{d_o}{2}\right)^2}{N_s\sigma} \frac{\pi\left(\frac{d_o}{2}\right)^2}{4\pi L^2} e^{gl}, l << L$$

where the spontaneous emission projected into solid angle element $\Delta\Omega$ orignates in a volume $\pi(d_o/2)^2/(N\sigma)$ at the end of the cylinder farthest from the aperture $d_o$. The quantity $\sigma$ is the cross-section for stimulated emission. The stimulated emission is amplified by a factor $e^{gl}$, where g is the gain of the amplifier and l is its length. The fraction of the spontaneous emission propogating through aperture $d_o$ is just the fractional solid angle subtended by the aperture $d_o$ at the emission site, $$\frac{\pi\left(\frac{d_o}{2}\right)^2}{4\pi L^2}$$

The number of elementary flux cylinders of diameter $d_o$ intercepting entrance aperture $d_l$ is simply $$K = \pi\left(\frac{d_o}{2}\right)^2 / \left(\pi\left(\frac{d_o}{2}\right)^2\right) = \left(\frac{d_1}{d_o}\right)^2$$

thus the total a.s.e. flux transmitted with the coherent signal will be determined by $$K \cdot \Delta I_{cylinder}$$

For the present purposes the prior art is reached from the above treatment with $d_l = d_o$, yielding $$\frac{I_{a.s.e.} \text{ (invention)}}{I_{a.s.e.} \text{ (prior art)}} \sim \frac{d_1^2 d_o^2}{d_1^4} = \left(\frac{d_o}{d_1}\right)^2$$

Thus, the admittedly crude estimate described above suggests a dominant reduction factor in a.s.e. content of amplifier output easily achieved from simple choice of design parameters.

Turning now to FIG. 3 an alternate embodiment features a lens 14 of negative curvature to diverge the flux incident thereon. The divergence is of such a degree as to introduce no substantial attenuation of the converging portion of the optical flux. The lens 14 operates on the non-converging flux to diverge this component through a relatively much greater solid angle than the converging component.

This embodiment permits an equivalent reduction in the a.s.e. content of the optical flux transmitted to the output of the amplifier stage. The focal properties of the diverging lens are such as to diverge the a.s.e. component: the degree of divergence affects the quantity of this component which is sufficiently diverged to be removed from the transmitted flux. It is apparent that the fraction of a.s.e. transmitted is drastically reduced as the distance of aperture 8 from the amplifier is increased. The diverging lens is preferably disposed and configured to render parallel the converging flux incident thereon. The location of the isolator element at a selected distance on the propogation axis clearly controls the degree of constaint imposed upon the a.s.e. component which can be transmitted with the now collimated coherent signal.

It will readily be recognized that for a multi-stage amplifier constructed from gain stages utilizing the present invention the collimating lens 9 illustrated may be replaced by the converging lens of the next adjacent stage.

An experimental device containing three stages of amplification was built and tested. The first two stages incorporated the present invention according to the embodiment of FIG. 2, using a pinhole aperture for spatial filtering. At the entrance of the first stage a converging lens focussed the input beam (roughly 2 mm. in diameter) onto a 50$\mu$ pinhole located 12 cm. from the lens. A gain cell containing Kiton Red 620 with a gain length of 1.5 cm.$\times$1 mm. high was disposed midway between lens and pinhole. After traversing the pinhole, the beam was expanded to approximately 6 mm. diameter with a negative lens and then refocussed with a second converging lens to a second 50$\mu$ pinhole aperture located about 15 cm. from the second lens. A second gain cell, substantially identical to that of the first stage was situated midway between the second converging lens and corresponding aperture. following the second aperture, the beam was again expanded to 7 mm. diameter and collimated with an appropriate lens. The now collimated beam then entered a third gain stage of conventional design located approximately 15 cm. from the last collimating lens.

The experimental device exhibited an overall gain in excess of $5\times10^5$ for picosecond pulses and a gain factor in excess of $3\times10^6$ was observed for continuous wave input. The total energy of a.s.e. in each case was less than 1% of the energy of the amplified coherent energy. Prior art devices using 3 or even 4 stages of amplification to achieve comparable gain are characterized by a.s.e. which overwhelms the amplified coherent energy unless specific additional measures are employed in the interstage regions.

The above described experimental device was not optimized to reduce the a.s.e. component although it is believed that further such reduction can be achieved.

Figure 5:
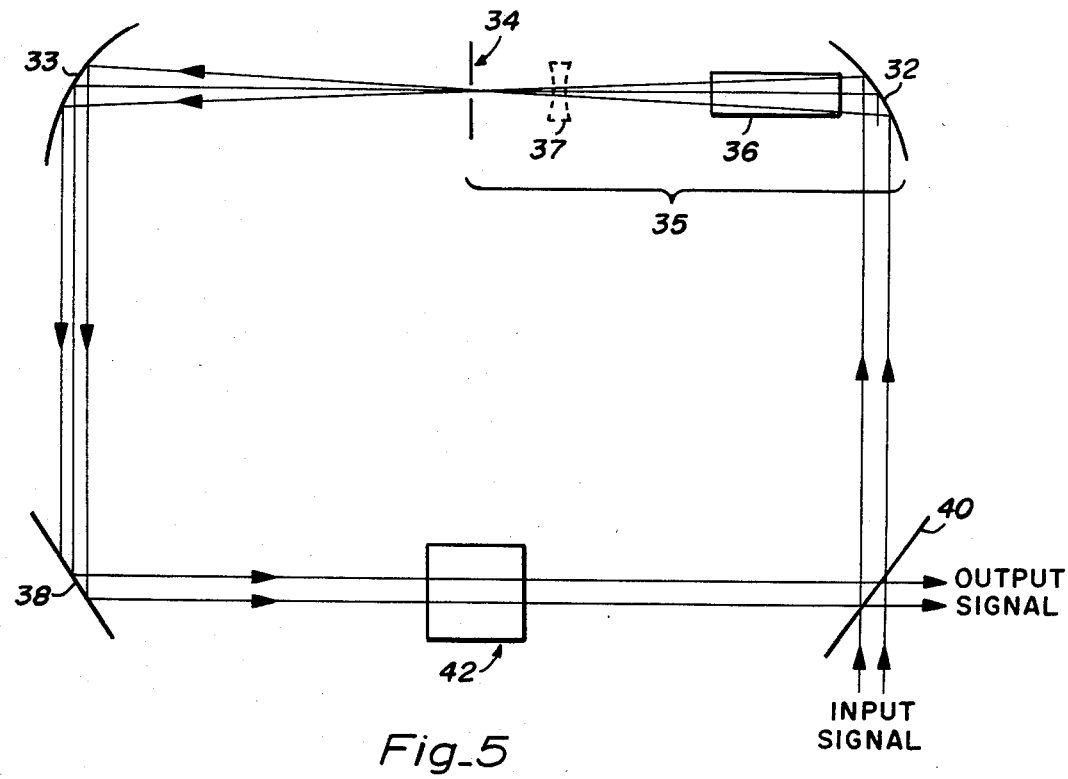
FIG. 5 is a regenerative amplifier embodiment.

The foregoing has described a noise suppressing gain stage for a multistage amplifier coupling a plurality of gain stages to provide desired increase in signal amplitude while severely limiting the amplitude of internally generated and amplified noise. Another embodiment of the invention is a regenerative, or traveling wave amplifier, a schematic embodiment of which is shown in FIG. 5. At least one high aspect ratio gain stage 35 comprises a converging mirror 32 or the equivalent and a gain medium 36 disposed in the converging region of the signal as determined by the converging means, here the focussing mirror 32. An isolator element 34 is positioned as described above substantially at the waist of the converging signal. The output of the gain stage is now diverging. Mirror 33 redirects the amplified signal and collimates the diverging amplified flux. Alternatively, mirror 33 is a plain mirror and another focussing element(s) is provided to counteract the divergence of the output flux. Further redirection of the optical flux is provided, for example by further reflecting elements (mirrors, prisms and the like) 38 and 40 to define a feedback path. Reflecting element 40 is a partially reflecting (partially transmitting) element to permit extraction of the amplified signal and coupling of an input signal to the amplifier. The unidirectional device 42 (a polarizer-Faraday rotator-polarizer combination) permits optical propogation in one direction only in the amplifier cavity. The structural implementation shown is clearly not the exclusive implementation for this embodiment. For example, different structures are known for coupling a signal into and from such an amplifier. Diverging lens 37 is symbolically indicated to specifically include the use of the telescopic embodiment of FIG. 3 in the regenerative circuit of FIG. 5.

The embodiment of FIG. 5 has deliberately been described as a traveling wave device to clearly delineate the contrast with a standing wave optical cavity wherein the optical flux transits the gain medium in both clockwise and counterclockwise directions. In such instance that a.s.e. portion suppressed during a counterclockwise propogating beam will be enhanced in a clockwise propogating base.

The regenerative amplifier as described above may also be operated as an oscillator. In this operational embodiment FIG. 5 need not be altered to establish a basic regenerative oscillator exhibiting the qualities resulting from the low noise characteristics of the present invention. Use in this mode ordinarily suggests additional components for amplitude, tuning, modulation and like control functions which are outside the scope of the present invention.

Reference throughout this work to "optical" flux and apparatus will be recognized as non-exclusive in respect to the application of the present invention to electromagnetic radiation exhibiting spatial coherence other than in the visible regions of the electromagnetic spectrum. Although this invention has been shown and described with respect to certain embodiments, it should be understood by those skilled in the art that various changes and omissions in the form and detail thereof may be made without departing from the spirit and scope of the invention.

What is claimed is:

1. Amplification apparatus for unidirectional propagation of an optical signal along a propagation axis through a gain medium with suppression of concomitant amplified spontaneous emission, comprising
   (a) converging means for accepting said optical signal and forming a waist in the radial extent thereof at a point distant along the propagation axis of said optical signal, (b) optical isolator means for selective transmission of optical flux incident thereon, said optical isolator means disposed substantially at said waist, (c) optical gain medium means for increasing the optical intensity of said propagating optical signal through stimulated emission phenomena, said gain medium disposed intermediate said converging means and said isolator means, whereby spontaneous emission noise occuring in and amplified by said gain medium is spatially dispersed in relation to the converging optical signal, and (d) a diverging lens disposed between said gain medium and said pinhole aperture.

2. The amplifier apparatus of claim 1 further comprising a diverging lens disposed between said gain medium and said saturable absorber.

3. The method of enhancing the signal to noise ratio at the output of an optical amplifier stage, comprising the steps of (a) introducing an optical signal to said amplifier stage, (b) converging said optical signal to form a waist in the transverse extent of said optical signal, (c) amplifying by stimulated emission phenomena said optical signal and concomitant spontaneous emission flux while carrying out said converging step, (d) selectively transmitting said converging amplified optical signal from said amplifier stage while selectively attenuating substantially all nonconverging flux issuing from said amplifier stage, and (e) diverging said converging amplified signal by an amount insufficient to substantially affect the intensity of said signal transmitting step thereof while diverging said nonconverging flux for attenuation of a still substantially greater portion thereof.

4. A traveling wave optical amplifier comprising (a) at least one gain stage comprising an input and output portion, (b) a feedback path for communication between said input and output portions, (c) a unidirectional transmission element disposed in said feedback path for selective attenuation of signal flux in said feedback path having a propogation direction other than from said output portion toward said input portion, (d) means for introducing a coherent signal to said input portion, (e) means for coupling a portion of the amplified signal from said traveling wave amplifier to form an output signal, said input portion comprising converging means for imposing convergence upon a portion of said coherent signal to form a waist in the spatial extent of said coherent signal followed by a diverging portion downstream of said waist, said gain stage further comprising a gain medium disposed within said converging portion of the coherent signal, a selective transmission element disposed substantially at said waist and means for collimating said the signal flux following said diverging portion.

* * * * *